United States Statutory Invention Registration [19]

[11] Reg. Number: H606

Ahn et al. [43] Published: Mar. 7, 1989

[54] PRESSURE SENSOR ASSEMBLY

[75] Inventors: Youngkee Ahn, Buffalo Grove; Donald O. Myers, Elgin, both of Ill.

[73] Assignee: Motorola, Inc.

[21] Appl. No.: 125,653

[22] Filed: Nov. 27, 1987

[51] Int. Cl.[4] ..... G01L 9/12

[52] U.S. Cl. ..... 361/283; 73/718

[58] Field of Search ..... 361/283; 73/718, 724

[56] References Cited

U.S. PATENT DOCUMENTS

| | | | |
|---|---|---|---|
| 3,496,775 | 2/1970 | Sargent | 73/718 X |
| 4,120,206 | 10/1978 | Rud | 361/283 X |
| 4,380,041 | 4/1983 | Ho | 361/283 |
| 4,384,899 | 5/1983 | Myers | 148/1.5 |
| 4,414,851 | 11/1983 | Maglic | 73/706 |
| 4,425,799 | 1/1984 | Park | 73/718 |
| 4,617,606 | 10/1986 | Shak et al. | 361/183 |

FOREIGN PATENT DOCUMENTS

| | | | |
|---|---|---|---|
| 32381 | 3/1977 | Japan . | |
| 222737 | 11/1985 | Japan | 73/718 |

*Primary Examiner*—Stephen C. Buczinski
*Assistant Examiner*—Linda J. Wallace
*Attorney, Agent, or Firm*—Phillip H. Melamed

[57] ABSTRACT

A pressure sensor assembly (10, 10') is disclosed in which a pressure sensing element (11, 11', 11'') is protected from external contaminants in an externally-applied pressure (P) to be sensed. This is accomplished by filling an external cavity (36) of a tubular portion (32) of a cover member (30) which fits over the pressure sensing element that has previously been mounted on a metallized substrate (14). The external cavity (36) is totally filled with an incompressibel liquid (35), such as silicon oil, and a thin diaphragm (40), preferably comprising a polyimide film, seals this external cavity and provides a compliant barrier between the externally-applied pressure (P) and the imcompressible fluid (35) and pressure sensing element (11). Chemical inertness of the diaphragm (40) and incompressible fluid (35) prevents contaminants in the sensed pressure (P) from attacking the pressure sensing element (11, 11', 11''), while transmitting changes in the sensed pressure (P) substantially directly to the pressure sensing element.

11 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

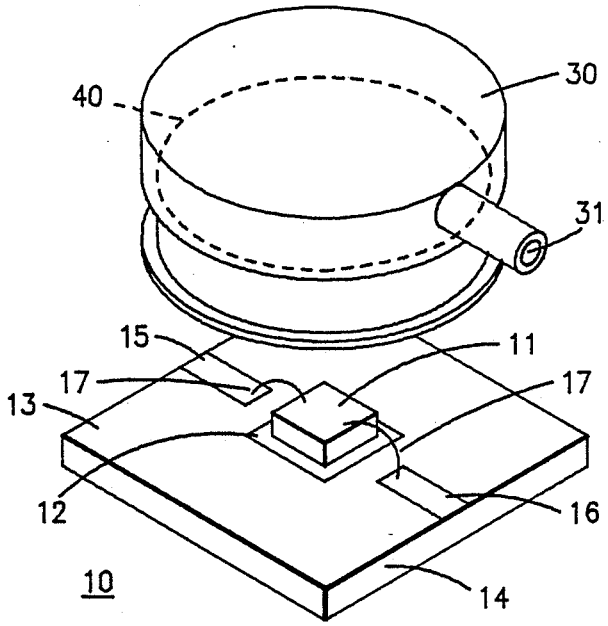
FIG. 1
FIG. 2
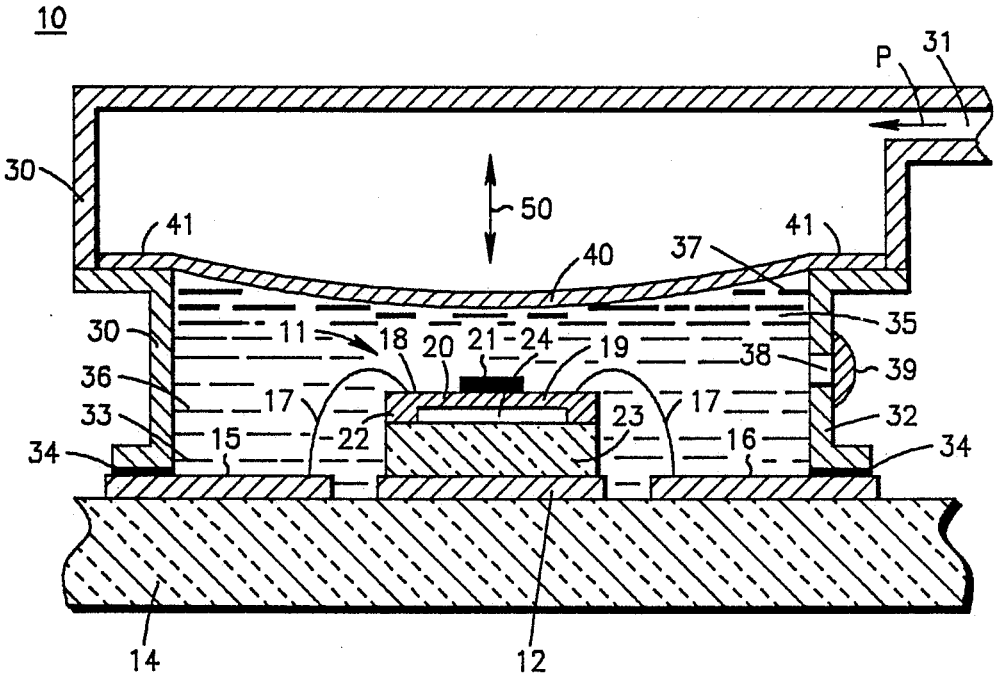

PRESSURE SENSOR ASSEMBLY

BACKGROUND OF THE INVENTION

The present invention is related to the field of pressure sensor assemblies, and more particularly to such assemblies in which the pressure sensing element or sensor within such assemblies is protected from hazardous chemicals or contaminants which may be contained in the medium the pressure of which is to be sensed.

Capacitive and piezoresistive pressure transducers are known in which, in response to the sensed pressure of a medium, an integral diaphragm is displaced. This causes changes in electrical characteristics of a component associated with the diaphragm, and these characteristics are representative of the sensed pressure. When such pressure sensors are utilized in the automotive environment for sensing engine manifold pressure, the medium, the pressure of which is being sensed, may contain hazardous chemicals such as gasoline or oil which may attack the pressure sensor and eventually degrade its performance. In addition, other environmental contaminants may be present in the manifold pressure medium such as moisture or salt, and these also can attack and/or degrade the pressure sensor and create erroneous pressure measurements.

Typically, the pressure sensor is mounted on a substrate and is contained within a mechanically protective housing mounted on the substrate. The housing and substrate essentially surround the sensor. While this provides mechanical protection for the sensor, protection from hazardous chemicals and contaminants in the medium, the pressure of which is to be sensed, must also be provided. In one typical prior pressure sensor assembly, a silicone gel or fluorosilicone gel is applied over the external surface of a pressure sensor and essentially partially fills the housing in which the pressure sensor is mounted. However, these gels, which form the direct interface between the medium being sensed and the pressure sensing element, are only somewhat resistant to contaminants in the medium being sensed. Thus, long-term exposure to harmful contaminants in the medium can still degrade the performance of the pressure sensor.

Some prior pressure sensors have contemplated filling an internal cavity within the pressure sensing element or sensor with an incompressible liquid such as silicon oil. This technique is typically used when two different liquid pressures are to be sensed and problems are encountered with respect to having one liquid fill a small volume internal cavity within the pressure sensing element between the sensor diaphragm and a base to which the diaphragm is mounted. Such oil-filled sensors essentially fill the internal cavity of the sensor with oil as a pressure interface medium. However, these sensors typically do not protect external portions of the sensing element, including the external surface of the diaphragm, from contaminants in the sensed medium external and adjacent to the diaphragm.

SUMMARY OF THE INVENTION

An object of the present invention is to provide a pressure sensor assembly in which improved protection for the pressure sensing element is provided which overcomes the above-noted disadvantages of prior pressure sensor assemblies.

According to one embodiment of the present invention, a pressure sensor assembly is provided comprising:

a pressure sensing element comprising at least one electrical component and an associated movable member joined to a base with an internal cavity effectively positioned therebetween, pressure applied external to said sensing element and coupled thereto altering the effective spacing between said movable member and said base and also resulting in varying at least one electrical characteristic of said component in accordance with said externally applied pressure; housing means for substantially surrounding and providing mechanical protection to said pressure sensing element, said housing means including an inlet opening therein for coupling said externally applied pressure therethrough to said sensing element for measurement thereby; an incompressible medium totally filing an external sealed cavity within said housing means separate from and external to said pressure sensing element and said internal cavity, said medium in said external cavity in contact with and directly adjacent to said movable member of said pressure sensing element; and a thin diaphragm having at least peripheral edges thereof fixed with respect to said housing means and said pressure sensing element base, a surface of said diaphragm in contact with said incompressible medium in said external cavity, said diaphragm forming a boundary of said external cavity and forming a compliant barrier between said incompressible medium and said externally applied pressure to be sensed by said pressure sensing element.

Essentially, the present invention preferably fills the external cavity surrounding the pressure sensing element with silicon oil, and preferably a polyimide film, such as Kapton, forms the compliant barrier between the silicon oil and the externally-applied pressure. The pressure sensing element can be either a silicon capacitive pressure sensing element, or a ceramic capacitive pressure sensing element, or a piezoresistive pressure sensing element. Regardless of the type of pressure sensing element involved, each of these will comprise a base and a movable member which serves as an effective integral diaphragm of the pressure sensing element. However, the present invention contemplates an additional thin Kapton film or ultrathin stainless steel diaphragm used to seal an external cavity surrounding the pressure sensing element and in which silicon oil is retained. This structure provides improved environmental protection for the pressure sensing element since the medium, the pressure of which is being sensed, is now separated from the pressure sensing element by not only the Kapton film but also by the silicon oil. This structure can be utilized regardless of whether or not the internal cavity within the pressure sensing element is liquid filled, since the present invention is concerned with protecting the exterior surfaces of the pressure sensing element from environmental contaminants.

Other objects, features and advantages of the present invention will become apparent from a review of the following detailed description of the present invention considered in conjunction with the accompanying drawings.

BRIEF DESCRIPTION OF THE DRAWINGS

FIG. 1 is an exploded perspective assembly view of a pressure sensor assembly constructed in accordance with the present invention;

FIG. 2 comprises a cross-sectional view of the pressure sensor assembly shown in FIG. 1, assuming that the assembly includes a pressure sensing element comprising a piezoresistive pressure transducer;

DESCRIPTION OF THE PREFERRED EMBODIMENTS

Figure 3:
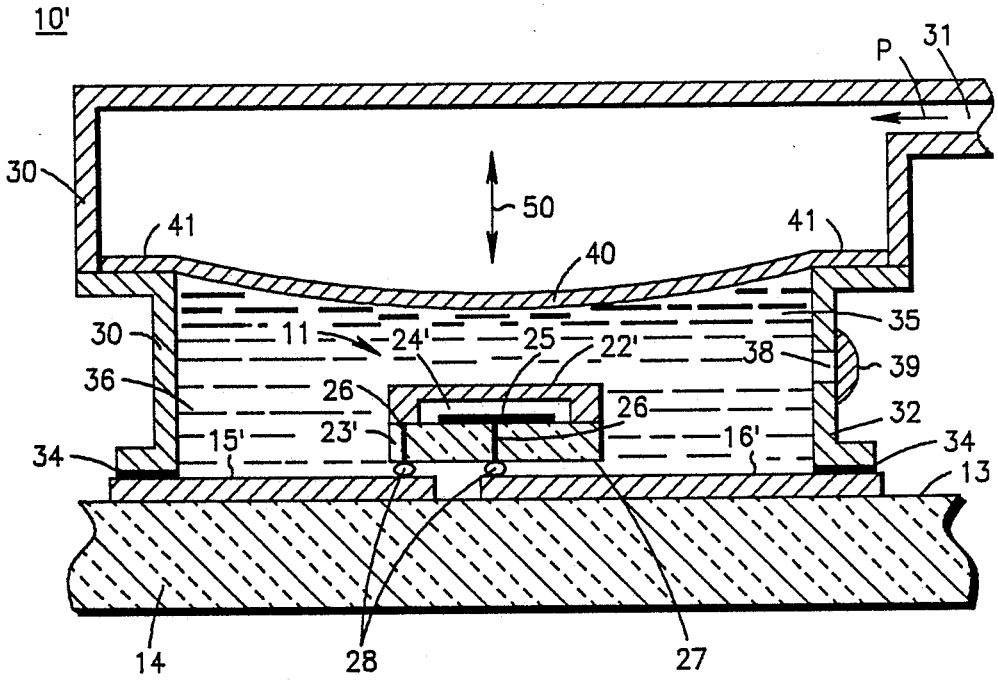
FIG. 3 is a cross-sectional view of the assembled pressure sensor assembly shown in FIG. 1, assuming that the assembly includes a pressure sensing element comprising a silicon capacitive pressure transducer.

Referring to FIG. 1, a pressure sensor assembly 10 constructed in accordance with the present invention is illustrated prior to final assembly. The assembly 10 comprises a pressure sensing element or sensor 11 bonded to a conductive metallization 12 on a portion of a top surface 13 of a nonconductive, preferably ceramic, plate-shaped substrate 14. The substrate 14, in addition to the metallization 12, also has conductor paths 15 and 16 provided on the top surface 13 by conductive metallizations deposited thereon. Electrical connection to the pressure sensing element 11 is provided by a pair of bonded wires 17 connected between the conductor paths 15 and 16 and associated bonding pad metallizations 18 and 19 provided on a top surface 20 of the pressure sensing element 11. This is more clearly shown in FIG. 2 which comprises an enlarged cross-sectional view of the assembly 10 after complete assembly.

The pressure sensing element 11, as most clearly shown in FIG. 2, comprises at least one electrical component, comprising a piezoresistive resistor 21, connected between the bonding pad metallizations 18 and 19 and positioned on the top surface 20. The pressure sensing element 11 essentially comprises a movable member (or integral diaphragm) 22 which is joined to a base member 23 with an internal cavity 24 effectively positioned between the movable member 22 and base 23. Pressure applied external to said pressure sensing element 11 will alter the effective spacing between the movable member 22 and base 23 by effectively reducing the volume of the internal cavity 24. This will effectively stress the top surface 20 of the pressure sensing element, corresponding to the top surface of the movable member 22, and result in varying the resistance characteristic of the piezoresistive resistor 21 in accordance with the magnitude of the externally-applied pressure. In FIG. 2, this externally-applied pressure is indicated by the reference alphabetic designation P. Thus the externally-applied pressure P moves the movable member 22 associated with resistor 21 causing changes in resistance.

The assembly 10 shown in FIGS. 1 and 2, includes a metallic cover member 30 which together with the substrate 14 comprises a housing means for the pressure sensing element 11 to provide mechanical protection thereto. The cover member 30 includes an inlet opening 31 for coupling the externally-applied pressure P through the cover member 30 to the pressure sensing element 11. The cover member 30 includes a tubular portion 32, shown best in FIG. 2, having a first open end 33 fixed and sealed to the metallized substrate 14 preferably by solder or an RTV rubber sealing compound 34. The pressure sensing element 11 is positioned within the tubular portion 32.

An incompressible medium 35, preferably comprising a liquid such as silicon oil, totally fills a sealed external cavity 36 within the tubular portion 32 wherein this sealed external cavity 36 is separate and external to the pressure sensing element 11 and the internal cavity 24. The silicon oil in the external cavity 36 is in contact with and directly adjacent to the movable member 22 of the pressure sensing element. A thin diaphragm 40 has at least peripheral edges 41 thereof fixed with respect to and bonded to the tubular portion 32 of the housing means. The diaphragm 40 forms a boundary of the external cavity 36 and forms a compliant sealed barrier between the incompressible medium 35 and the externally-applied pressure P to be sensed by the pressure sensing element 11. The thin diaphragm 40 effectively seals closed a second open end 37 of the tubular portion 32 by having the peripheral edges 41 bonded to the tubular portion 32.

As can be seen in FIG. 2, the tubular portion 32 essentially comprises side walls which effectively terminate at said first open end 33 and are effectively sealed to the metallized substrate 14. FIG. 2 also illustrates that the bonded wires 17 extend external to the pressure sensing element 11 and are in contact with and substantially surrounded by the incompressible medium 35. It should be noted that preferably the thin diaphragm 40 comprises a thin polyimide film preferably having longitudinal ductile and non-elastic properties. This polyimide film can comprise Kapton film which may be metallized at the peripheral edges 41 to facilitate bonding these edges to the tubular portion 32 by soldering, for example. Ultrathin stainless steel may also be useable for diaphragm 40.

While the assembly 1 shown in FIGS. 1 and 2 preferably illustrates the pressure sensing element 11 as a piezoresistive pressure transducer, it is also possible to construct the pressure sensing element 11 as a capacitive pressure transducer, such as a silicon capacitive pressure transducer. FIG. 3 illustrates a cross-sectional view of a sensor assembly 10' in which a silicon capacitive pressure sensing element 11' is positioned within the tubular portion 32. In FIG. 3, identical reference numerals corresponding to the reference numerals utilized in FIGS. 1 and 2 have been utilized to identify identical corresponding components, whereas prime notation for reference numerals has been utilized to identify similar corresponding structure.

In FIG. 3, the pressure sensing element 11' again includes a movable member 22' which now comprises an etched silicon diaphragm that is bonded to a base 23' comprising a glass substrate. A sealed internal cavity 24' is provided between these elements and the silicon movable member 22' comprises one electrode of a capacitor 28 having an additional electrode 25 being provided on a top surface of the base 23' to which the silicon movable member 22' is bonded. Electrode connections 26 from the silicon movable member 22' and electrode 25 are sealed in the glass base 23' and emerge on a bottom surface 27 of the pressure sensing element 11'. Preferably solder connections 28 are utilized to form electrical and mechanical connections between these electrodes 26 and associated conductor metallizations 15' and 16' on the top surface 13 of the metallized substrate 14. For the assembly 10' in FIG. 3 again the diaphragm 40 is provided as a compliant barrier between the incompressible medium 35 which surrounds the pressure sensing element 11' and 11' the externally-applied pressure P the magnitude of which is to be sensed by the sensing element 11'.

The operation of the pressure sensor assemblies 10 and 10' will now be discussed. Essentially, changes in the externally-applied pressure P, will result in very slight inward or outward deflections of the thin diaphragm 40 in directions indicated by the reference arrows 50. The incompressible medium 35 will transmit pressure changes in the pressure P to the movable members 22 and 22' of the pressure sensing elements 11 and 11', respectively. For the piezoresistive pressure sensing element 11, this results in changes in the resistance between the bonding pad metallizations 18 and 19 in accordance with the amount of sensed pressure due to the flexing of the movable member 22. The use of a flexing integral diaphragm of a sensor to cause resistive changes in a piezoresistive resistor on the flexing member is conventional and well understood by those of skill in the art. Similarly, for the pressure sensing element 11', pressure changes transmitted by the incompressible fluid 35 to the silicon movable member 22', these result in altering the capacitance between the silicon movable member 22' and the electrode 25. This change in capacitance comprises a change in the electrical characteristic of the capacitor 28 which is therefore representative of the sensed pressure. For both of the sensing elements 11 and 11' the effective spacing between an integral movable member 22 or 22' and a base 23 or 23' is altered by sensed pressure changes, since the volume of the cavity 24 or 24' is slightly altered. Also in both cases the electrical characteristics of a component associated with the movable member are changed.

Silicon capacitive pressure transducers such as that shown in FIG. 3 are illustrated in U.S. Pat. Nos. 4,384 899 to Myers and 4,617,606 to Shak et al., both of which are assigned to the same assignee as the present invention. It should also be noted that the capacitive sensing element 11' shown in FIG. 3 could also comprise a ceramic capacitive pressure sensing element such as that shown in U.S. Pat. No. 4,380,014 to Ho, also assigned to the same assignee as the present invention.

Essentially, the diaphragm 40 retains the silicon oil in the external cavity 36 and permits the transfer of pressure changes in the sensed pressure P to the incompressible medium 35 for sensing by the sensing element 11 or 11' while also preventing contaminants in the sensed pressure P from coming into contact with the pressure sensing element. In addition, the presence of the incompressible medium 35 also insulates the pressure sensing element from contaminants in the sensed pressure P. The combination of the incompressible medium 35 and thin diaphragm 40 provides substantial protection for the pressure sensing element 11 or 11' since both of these components are substantially chemically inert and therefore substantially immune from attack of corrosive contaminants which may be contained in the pressure P such as gasoline, oil, salt or other contaminants. Thus preferably the diaphragm 40 is an inert polyimide film and the incompressible medium 35 comprises silicon oil.

It is significant to note that while prior assemblies have essentially utilized a silicone gel over the pressure sensing element, typically no effort was made to then isolate this silicone gel from the sensed pressure P. This therefore resulted in contaminants in the pressure P attacking the silicone gel. By providing a sealed external cavity 35 through the use of the diaphragm 40, and totally filling it with an incompressible medium 35, this deficiency of the prior art has been overcome. The present technique of isolating the pressure sensing element from contaminants in the pressures to be sensed differs from the prior art structures which contemplated filling the internal cavity 24 or 24' of the pressure sensing element with silicon oil. Now the incompressible medium is external to the pressure sensing element and protects the external surface of the integral movable meber of the sensing element from contaminants. The present structure also protects the electrode connections which emerge from the sensing element such as the bonded wires 17 in FIGS. 1 and 2 and the solder connections 28 to the electrodes 26 in FIG. 3.

The steps for assembling the pressure sensor assemblies 10 and 10' are as follows. First, the thin diaphragm film 40 has its peripheral edges 41 attached to the tubular portion 32 of the cover member 30. Then, the cover member 30 is mounted on the substrate 14 by virtue of the sealing means 34 bonding the tubular portion 32 to the substrate 14. Prior to this step, the pressure sensing element 11 or 11' is mounted on the substrate 14, and electrical connections to the electrodes of the sensing element have been made via conductive epoxy, solder or bonded wires. After the cover member 34 has been mounted to the substrate with the pressure sensing element within the external cavity 36, then the external cavity 36 is evacuated via an opening 38 in the side walls of the tubular portion 32. Subsequently, this partial assembly is then immersed in silicon oil such that the silicon oil will then fill the external cavity 36. Then the opening 38 is sealed by a sealing mechanism 39 which can comprise either a solder seal or some other relatively durable seal. It should be noted that possibly the opening 38 can be in the substrate 14.

It should be noted that preferably under normal applied pressure corresponding to the externally-applied pressure P, and at normal ambient temperature, the diaphragm 40 will be positioned as shown in FIGS. 2 and 3 such that it is normally deflected inward towards the pressure sensing element. At elevated temperatures the silicon oil in cavity 36 expands. However, the diaphragm 40 will not be expanded beyond its elastic limit and expansion of the silicon oil, by itself, will not result in any increased pressure being transmitted to the pressure sensing element 11. Preferably the diaphragm 40 is a thin film which is longitudinally ductile in that it can be expanded, but it also has effective non-elastic properties in that during the operative range of the sensor it will not apply substantial pressure back against the incompressible fluid if this fluid expands.

It should be noted that the medium 35 should be incompressible, since otherwise there will be no direct linear transmission of force to the movable members 22 and 22' due to the pressure P. This is because a non-incompressible medium could not properly transfer the force of pressure P to the pressure sensing element 11 without characterization of the compressibility of the medium 35. Thus an incompressible medium 35 is preferred.

For the pressure sensing elements 11 and 11', it should be noted that the internal cavities 24 and 24' are effectively sealed such that a predetermined reference pressure is stored therein. This results in the pressure sensor element providing an output related to the magnitude of the externally-applied pressure P with respect to this predetermined reference pressure in the internal cavity. Such sensors are generally termed absolute pressure sensors. However, the present invention is also applicable to differential or gauge pressure sensors.

Figure 4:
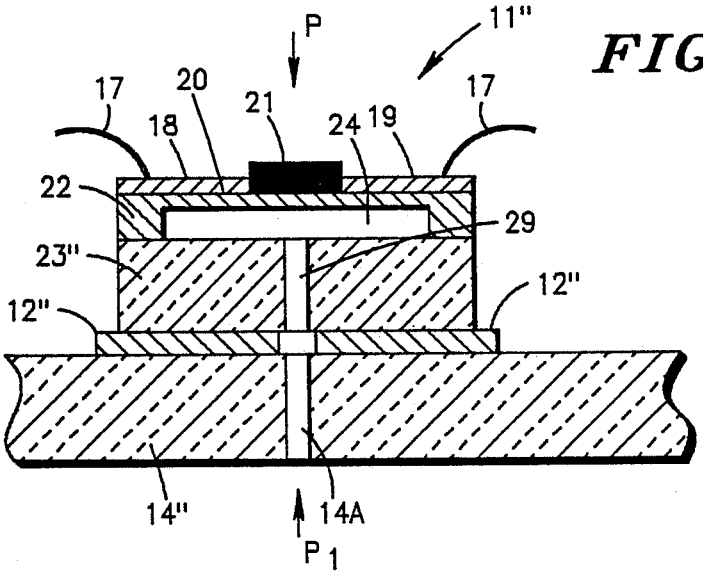
FIG. 4 comprises an enlarged cross-sectional view of a portion of the pressure sensor assembly shown in FIG. 2 in which the sensing element has been modified such that a differential, rather than absolute, pressure sensor assembly has now been provided.

FIG. 4 illustrates the configuration for a differential piezoresistive pressure sensing element 11″ which can be utilized in the pressure sensor assembly 10 shown in FIGS. 1 and 2. For the sensing element 11″, essentially the primary difference between this element and the sensing element 11 in FIG. 2 is that the internal cavity 24 now is not sealed totally within the sensing element, but connects to a channel 29 in a base 23″. The channel 29 connects to a channel 14A in a metallized substrate 14″. Thus, the pressure sensing element 11″ will provide an electrical component characteristic, via the bonded wires 17, related to the difference between the externally-applied pressure P applied to the top surface 20 of the movable member 22 and a pressure $P_1$ applied through the channels 14A and 29 to the internal cavity 24. Such differential pressure sensors are well known, and one such ceramic capacitive differential sensor is illustrated in U.S. Pat. No. 4,414,851 to Maglic assigned to the same assignee as the present invention. In the Maglic patent, as in prior oil-filled pressure sensing elements, oil is used to prevent contaminants from entering the internal cavity of the pressure sensing element, as well as to insure the transmission of pressure to this internal cavity. However, the present invention deals with protecting the exterior of the pressure sensing element from environmental contaminants.

While we have shown and described specific embodiments of this invention, further modifications and improvements will occur to those skilled in the art. All such modifications which retain the basic underlying principles disclosed and claimed herein are within the scope of this invention.

We claim:

1. A pressure sensor assembly comprising:

a pressure sensing element comprising at least one electrical component and an associated movable member joined to a base with an internal cavity effectively positioned therebetween, pressure applied external to said sensing element and coupled thereto altering the effective spacing between said movable member and said base and also resulting in varying at least one electrical characteristic of said component in accordance with said externally applied pressure;

housing means for substantially surrounding and providing mechanical protection to said pressure sensing element, said housing means including an inlet opening therein for coupling said externally applied pressure therethrough to said sensing element for measurement thereby;

an incompressible medium totally filling an external sealed cavity within said housing means separate from and external to said pressure sensing element and said internal cavity, said medium in said external cavity in contact with and directly adjacent to said movable member of said pressure sensing element; and a thin diaphragm, in addition to said movable member, having at least peripheral edges thereof fixed with respect to said housing means and said pressure sensing element base, a surface of said diaphragm in contact with said incompressible medium in said external cavity, said diaphragm forming a boundary of said external cavity and forming a compliant barrier between said incompressible medium and said externally applied pressure to be sensed by said pressure sensing element, wherein the housing means comprises at least a tubular portion having one open end fixed to a metallized substrate having conductor paths on a top surface thereof electrically connected to said pressure sensing element, said pressure sensing element mounted on said substrate and within said tubular portion.

2. A pressure sensor assembly according to claim 1 wherein a second open end of said tubular portion is effectively sealed closed by said diaphragm which has peripheral portions thereof bonded to said tubular portion.

3. A pressure sensor assembly according to claim 2 wherein said tubular portion has side walls which effectively terminate at said first end opening and are effectively sealed to said substrate.

4. A pressure sensor assembly according to claim 3 wherein said incompressible medium comprises a liquid.

5. A pressure sensor assembly according to claim 3 wherein said pressure sensing element comprises at least one of a piezoresistive pressure transducer and a capacitive pressure transducer.

6. A pressure sensor assembly according to claim 5 wherein said one transducer has a bottom planar surface planarly bonded to a planar portion of said top surface of said substrate, a portion of a top surface of said one transducer electrically connected to at least one of said conductor paths by a bonded wire.

7. A pressure sensor assembly according to claim 6 wherein said bonded wire extends external to said one transducer from its top surface to said one conductor path and is in contact with and substantially surrounded by said incompressible medium.

8. A pressure sensor assembly according to claim 5 where said one transducer has a bottom surface bonded to said top surface of said substrate with a plurality of transducer electrode connections emerging on said transducer bottom surface and connected to associated ones of said conductor paths on said substrate top surface.

9. A pressure sensor assembly according to claim 5 wherein said diaphragm comprises a polyimide film.

10. A pressure sensor assembly according to claim 1 wherein said diaphragm effectively comprises a thin film having longitudinal ductile and effective non-elastic properties.

11. A pressure sensor assembly according to claim 1 wherein said internal cavity is sealed and a predetermined reference pressure is stored therein.

* * * * *